United States Patent [19]

Desty et al.

[11] 4,098,086
[45] Jul. 4, 1978

[54] BREAKWATER

[75] Inventors: Denis Henry Desty, Weybridge; Roger Duckworth, Guildford, both of England

[73] Assignee: The British Petroleum Company Limited, Sunbury-on-Thames, England

[21] Appl. No.: 733,285

[22] Filed: Oct. 18, 1976

[30] Foreign Application Priority Data

Oct. 17, 1975 [GB] United Kingdom .............. 42672/75

[51] Int. Cl.² .............................................. E02B 3/06
[52] U.S. Cl. ................................................ 61/5; 61/4
[58] Field of Search .................. 61/6, 5, 3, 4, 1, 37, 61/38

[56] References Cited

U.S. PATENT DOCUMENTS

| 436,644 | 9/1890 | White | 61/5 |
| 3,465,528 | 9/1969 | Usab | 61/5 |
| 3,908,384 | 9/1975 | Frey | 61/5 |

FOREIGN PATENT DOCUMENTS

| 2,405,197 | 8/1974 | Fed. Rep. of Germany | 61/5 |
| 8,038 of | 1886 | United Kingdom | 61/5 |

Primary Examiner—Dennis L. Taylor
Attorney, Agent, or Firm—Morgan, Finnegan, Pine, Foley & Lee

[57] ABSTRACT

Method of wave calming in which a plate rigid in the direction of wave travel is suspended in the water to be calmed. The plate has a length of one half of the incident water wavelength in the wave direction and is suspended to a still water depth of 1/5 to 1/40 of the plate beam.

9 Claims, 5 Drawing Figures

Section A-A.

FIG.2
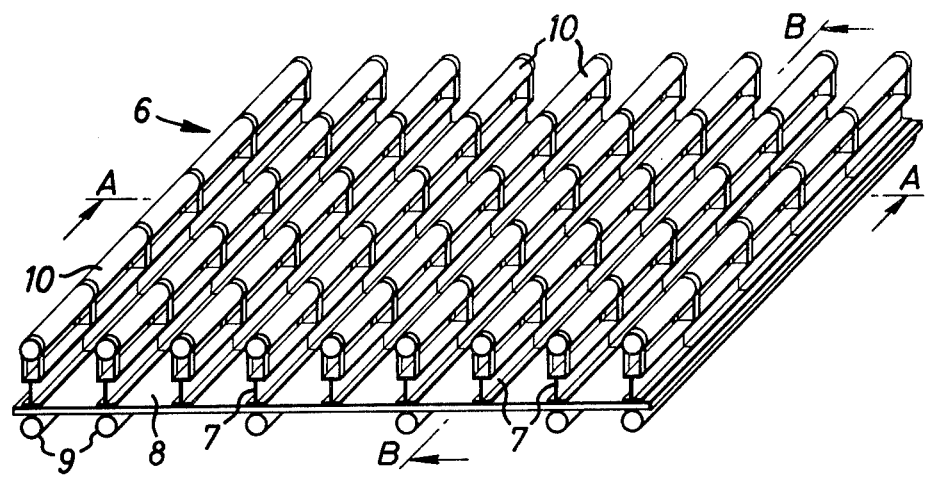
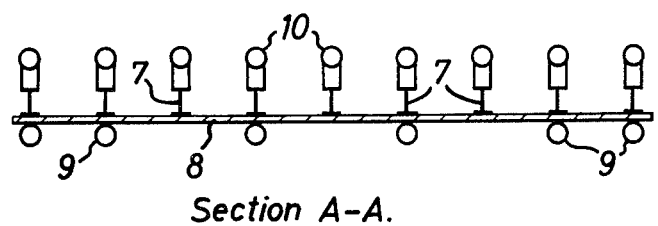
Section A—A.
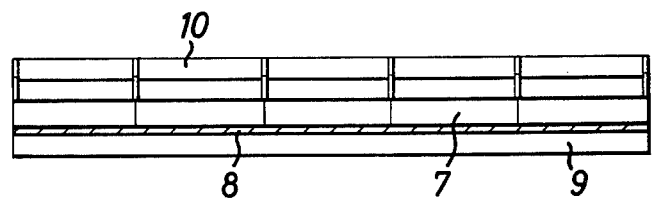
Section B—B.

FIG.3
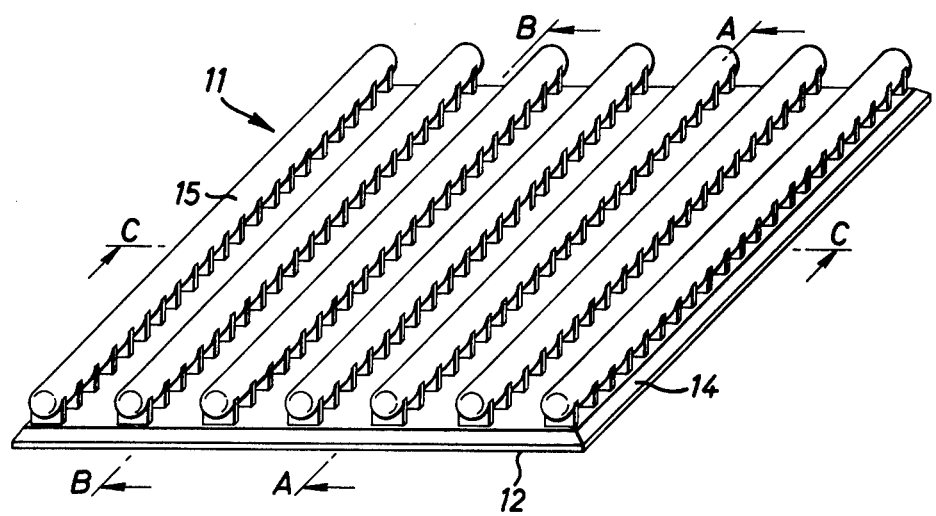
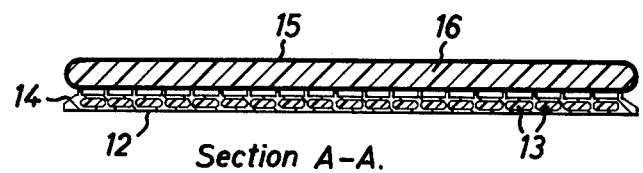
Section A-A.
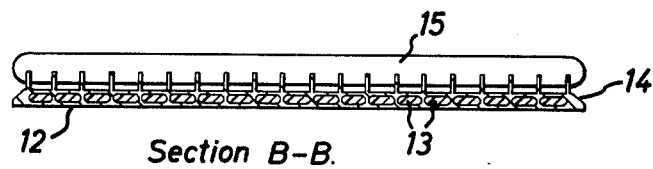
Section B-B.
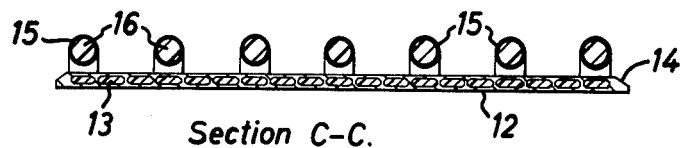
Section C-C.

BREAKWATER

The present invention relates to the reduction of liquid wave sizes and more particularly relates to the reduction of sea water wave heights in the vicinity of marine installations and the like.

Wave reduction devices may be scaled to protect operations varying from oil drilling platforms, loading buoys and similar open sea marine operations in exposed ocean locations to fish farms or yacht marinas in estuaries.

It is an object of the present invention to provide a floating wave reduction system which substantially attenuates wave height during its passage towards the installation being protected.

It has been observed that a train of waves in deep water (depth greater than a half of the wave length) passes through a similar train of waves travelling in a different direction with little loss of energy. If the waves are temporarily converted into shallow water waves collisions are then destructive and cause dissipation of wave energy as heat.

According to the invention there is provided a floating breakwater suitable for reducing the height of liquid waves comprising a. a plate of material substantially rigid in its beam direction,
b. means for positioning the plate of material substantially at right angles to the direction of the liquid waves thus making the beam direction parallel to the liquid wave direction,
c. the plate having a liquid wavelength to beam ratio of 0.5 to 5,
d. means for locating the upper surface of the plate at a depth of 1/5 to 1/40 the plate beam length below the mean liquid surface level, and
e. means for allowing rocking of the plate along a horizontal axis substantially at right angles to the plate beam direction.

In order to facilitate this rocking mode, particularly when reducing wavelengths greater than the plate beam length, the plate preferably has considerable mass located near the central axis parallel to the liquid surface and at right angles to the liquid wave direction giving a low moment of inertia about this axis.

The breakwater comprises two basic embodiments (i) the plate is stiff in the beam direction and sufficiently flexible across the beam to allow the plate to conform to short crested waves or cross seas without undue stress, or (ii) the plate is stiff both along and across the beam directions.

Flexibility across the beam allows continuous fabrication and deployment of a breakwater of unlimited length. The breakwater may be towed through waves at any angle without failure from the construction site to the point of deployment.

A stiff device both along and across the beam may only be constructed and deployed as short length modules of length restricted by the probability of exposure to cross wave conditions.

Stiff modules may be deployed in arrays to cover a large wave frontage. Gaps between modules may be as large as wavelength/2λ before efficiency is lost.

For type (i), the required rigidity of the plate in the beam direction may be obtained by forming the plate from corrugated material so that the ridges run in the beam direction while across the beam the low stiffness allows the plate to flex in short crested wave conditions without high stress levels developing. Sheet steel piling may readily be welded to form extensive areas of corrugated plate which can be used as the basis for a breakwater.

The corrugations are aligned in the beam direction to cause stiffness in the beam while the plate is flexible across the beam direction.

A plate which is flexible across the beam may also be made from timber or composite boarding. Steel I-beams may be used to provide beam direction stiffness.

A stiff structure breakwater of type (ii) may be formed using tubular space framing with timber metal or plastic plate panels, or the plate may be formed from reinforced concrete with doam filled voids to provide buoyancy. A stiff structure of type (ii) may also be formed by inflating a bag or container of suitable shape by use of a compressed gas.

Preferably, the plate is continuous with no holes over the major part of the area, but oscillation of the plate may be improved by the provision of holes in the plate near the leading and trailing edges to allow the passage of water between the top and bottom faces of the plate.

Buoyancy is required to maintain the plate at the design immersion depth of 1/5 to 1/40 of the plate beams length below the mean liquid surface level. Buoyancy in excess of this basic requirement may be available in surface floats to lift the plate in response to wave motion, and to prevent excessive increase in draught with the onset of marine fouling and local failure of immersed buoyancy after a period of service. The excess buoyancy (i.e. the volume of closed structure above still water level) must be at least 10 percent of the volume of closed structure below water in still conditions to satisfy these requirements. A proportion of the buoyancy which would be immersed in still water must be close to the surface to ensure that a downward restoring force occurs if the plate rises as a result of wave action. The required proportion increases with the severity of the waves.

Thus, in flexible type (i) structures, the buoyancy may be provided by tubes, foam, bags or chambers above or preferably below the plate. The corrugations may be used to protect the structurally weaker buoyancy members. Tubes above the plate parallel to the beam may be used to give excess buoyancy and a proportion of the immersed buoyancy.

Both types of buoyancy may be localised or distributed over the plate, preferably the latter, since small buoyancy chambers well distributed across the plate cause lower stress levels in the plate than a few large buoyancy units.

For stiff type (ii) structures, the buoyancy may be provided by foam filled voids in concrete, if used, or generally by the methods described for type (i) above.

The means for positioning the plate for counteracting excess buoyancy to hold it at the required depths may be mooring lines. Further buoyancy may be supported off the plate to satisfy the above design criteria.

Moorings may be made to any points of the device but preferably to obtain minimum snatch loads, the mooring points are located near to the centre beam line on the underside. Such mooring points also allow the preferred rocking movement. Preferably, substantial mooring lines with a life equal to that of the breakwater should be run for a length sufficient to clear the breakwater where conventional mooring cable may be attached and adjusted. Mooring lines preferably run both to the weather and leeward sides and may be anchored in any convenient manner. The anchor on the weather side will normally be more substantial than the anchor positioned to leeward (see mooring figure).

The optimum plate beam length and immersion depth are selected for each installation depending on the protection characteristics required and the construction materials and methods used. Preferably the liquid wavelength to beam length ratio is 1.0 to 2.0. Thus for waves with wavelengths of from 10 to 50 meters, such as encountered in practice, the beam may range from 5 to 100 meters and the depth of the plate upper surface may be 0.5 to 20 meters below the mean liquid surface level, depending on the actual wavelength. Preferably a plate immersion depth of 1/20 to 1/30 of the plate beam is used.

For example a plate with a beam of half a wavelength causes effective surface collisions for waves of steepness 1:30 if the immersion depth in still liquid is 1/25 of the beam. At increased immersion depths the plate will only cause surface collisions in steeper waves. Very small immersion depths (less than 1/40 of breakwater beam) cause surface collisions to be weak and ineffective. The stresses on the plate increase if the leading and trailing edges of the plate rise clear of the surface of the wave when the plate rocks.

Significant wave reduction is achieved even in low steepness swell conditions for waves of length up to 3 times the breakwater beam. Confused seas of mixed wave trains are also effectively reduced.

The breakwater may have several shapes of plate. Thin uniform thickness plates may be supported at constant depth in still water, or at a reducing depth towards the trailing edge to increase effective wave reduction for waves with short wavelengths compared with the plate beam. An increase in plate thickness towards the centre of the plate beam with a corresponding reduction in water depth causes improved reduction of short waves and forms a rigid structure both along and across the beam.

The invention also includes a method of reducing the height of liquid waves by use of a breakwater as hereinbefore described.

In the breakwaters according to the invention, the plates lies below the liquid surface and undergoes little motion in liquid waves of wavelength less than the beam length of the plate. The wave height is mainly reduced by the liquid waves breaking over a substantially stationary horizontal plate. Waves having a greater wave length than the plate beam length cause the leading and trailing edges of the plate to rise and fall with the changing liquid level in the approaching waves. The liquid particle motion causes the crests of waves to pass onto the leading edge of the plate while, as it rises with an approaching wave, water from the troughs of waves passes onto the trailing edge as it is depressed. The waves which pass onto the plate become steeper in the shallow water and move more slowly across the plate than the parent waves beneath.

Wave reduction then results from collision of the shallow water waves on the plate, phase delay of waves passing over the plate with respect to the parent waves beneath and stabilisation of the plate due to the out of phase water loading above the plate. These effects are additional to the normal interference to wave motion caused by a substantially horizontal stiff plate at or near the water surface, and extend the useful wave reduction performance to high wavelength/beam ratios.

The invention will now be described by way of example only with reference to FIGS. 1 to 5 of the accompanying drawings.

FIG. 2 shows a perspective and vertical section of a floating breakwater in the form of steel I-beams and timber plank decking.

FIG. 3 shows a perspective and vertical sections of a floating breakwater in the form of a plate of reinforced concrete with polystyrene filled voids.

Figure 1:
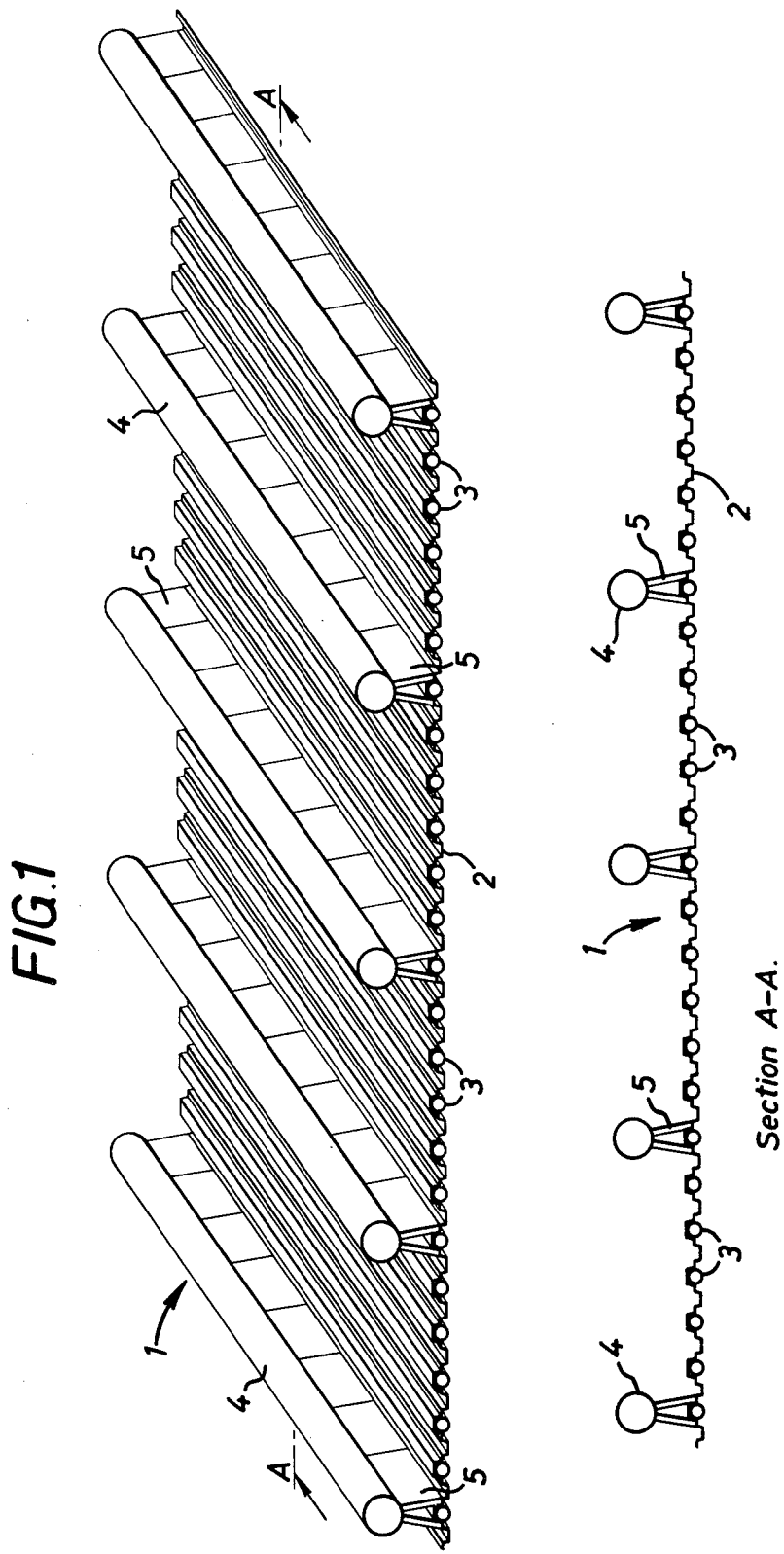
FIG. 1 shows a perspective and cross-section of a floating breakwater in the form of an integral corrugated plate unit.

An embodiment of the present invention is shown in FIG. 1 wherein the breakwater 1 comprises a number of sheet piles 2 which are interlocked and welded together to form an integrated corrugated plate unit. The breakwater 1 is rendered buoyant by means of parallel polyvinyl chloride pipes 3 (in the plate beam direction) strapped to the underside of the piles 2 and located in the corrugated grooves of the plate together with further parallel high density polyethylene pipes or buoyancy tubes 4 bracketed to the top surface by means of channel plinths 5 such that in still water conditions, the pipes 4 would break the water surface. The latter allows for minor variations in weight and floating level of the plate and also to provide a stabilising effect in the rocking mode of the breakwater. In the rocking mode of the breakwater, rocking will occur about a horizontal axis at right angles to the parallel pipes 3, 4.

Another example of the invention is shown in FIG. 2 in which the floating breakwater 6 is formed from widely spaced fabricated steel 'I' beams 7 fixed and spaced substantially parallel to each other and stiffened between with bolted timber plank decking spans 8. The buoyancy of the breakwater 6 is achieved by means of spaced polyethylene buoyancy tubes 10 parallel to and bracketed from the top of the I-beams 7. Further buoyancy is provided by polyvinyl chloride pipes 9 beneath the I-beams 7 in order to obtain the desired operating draught. The timber used as the structural material for the decking 8 has an advantageous strength/flexibility ratio.

FIGS. 1 and 2 are examples of breakwaters in which the plate is stiff in the beam direction and having some flexibility across the beam to conform with short crested waves or cross seas. FIG. 3 is an example of a breakwater which is stiff both along and across the beam direction. The breakwater 11 comprises a rocking plate formed by a hollow reinforced concrete slab 12 having a series of parallel polystyrene filled voids 13 across the plate beam direction. The slab edges 14 are chamfered to give a sloped approach for the incident waves. Buoyancy is provided with parallel fibre reinforced buoyancy tanks 15 encasing a polystyrene formers 16 in the plate beam direction. Alternatively, polyethylene buoyancy tubes may be used.

Figure 4:
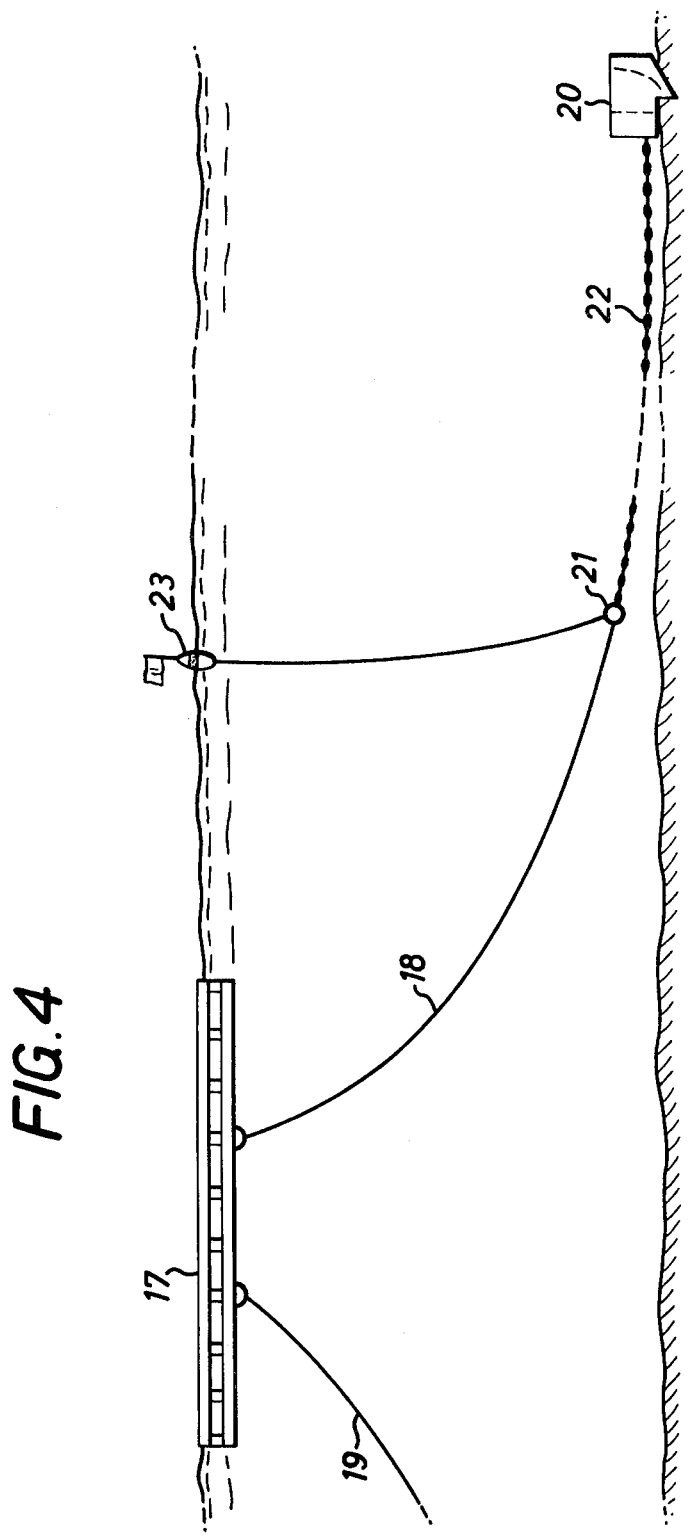
FIG. 4 shows a perspective view of a mooring system and ground tackle for a rocking plate floating breakwater.

FIG. 4 shows an example of a mooring system for rocking plate floating breakwaters according to the invention.

The breakwater 17 has a pair of mooring points to which are attached a heavy duty primary mooring line 18 and a light leeward mooring line 19. The primary mooring line 17 is attached to a massive concrete type anchor 20 through a make up ring 21 and a ground chain 22. A buoy 23 may also be attached to the make up ring 21 for marker purposes.

Whether the rigid or semi-flexible type of breakwater is used, the breakwater is constructed in sections (say 20 m length for rigid types and 100 m length for the semi-flexible types). In order to achieve a fail-safe requirement, the anchor lines come from the sections rather than from linkages so that if one section is lost, the adjacent sections do not lose their stability.

Each 20 m. section has single leading and trailing anchorages. The trailing anchors are sized for conditions and location and are lighter than the leading anchors.

The anchorage lines 18, 19 are attached to the underside of the breakwater 17 roughly centrally. This allows the plate to rock without snatching unduly or being restrained by its moorings.

Figure 5:
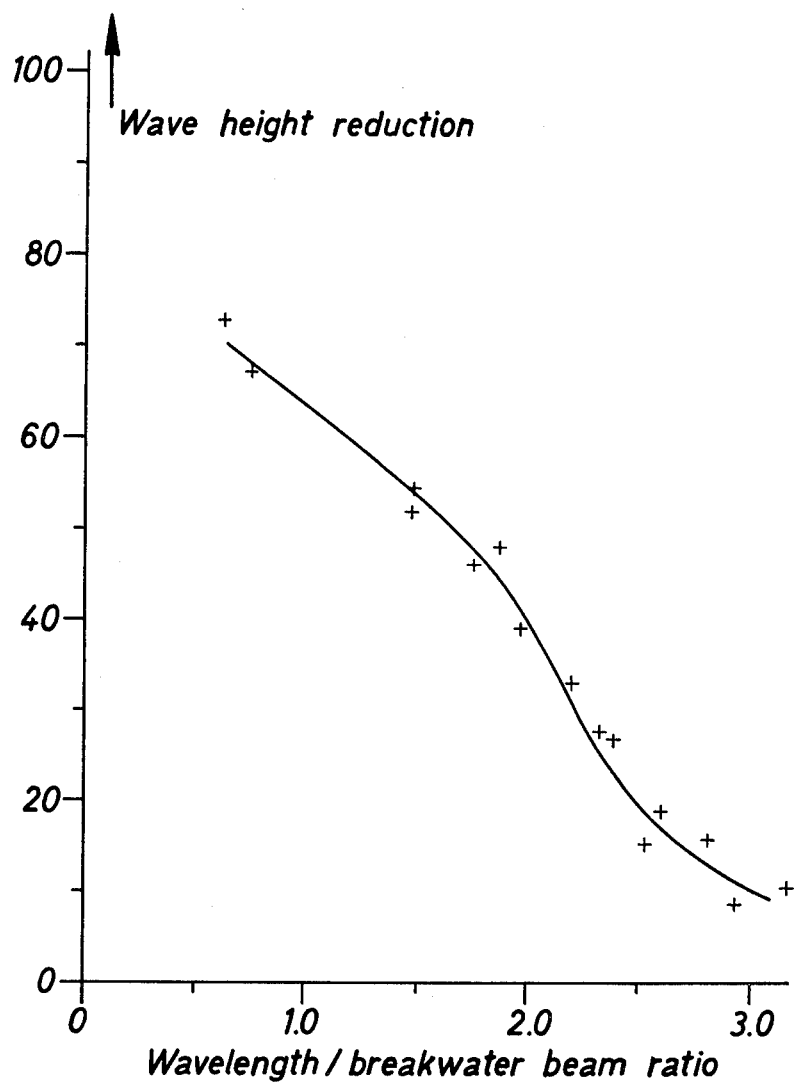
FIG. 5 shows the variation of wave height reduction with liquid wavelength/breakwater beam ratio for monofunction liquid waves.

Rocking plate models with beams of length from 0.10 to 3 m have been tested in wave tanks in both mono-function long crested waves and random short crested wave conditions with wave steepness in the range 1:120 to 1:10. The wave reduction achieved immediately in the lee of a model of beam 3 m and length 10 m moored with the beam in the propagation direction of long crested waves is shown in the FIG. 5. For a wavelength/breakwater beam of 1 the wave height is reduced by 65 percent while at a ratio of 2 the reduction is 40 percent and at a ratio of 3 the reduction is 10 percent. Qualitative studies in violent short crested waves representative of storm conditions indicate even more effective wave reduction. The wave height reduction achieved is given by (1 — transmitted waveheight/incident wave height) × 100%.

We claim:

1. A floating breakwater suitable for reducing the height of liquid waves comprising a plate having a beam direction and a cross-beam direction at right angles and in the plane of the plate, the plate being substantially rigid at least along the beam direction, wherein the ratio of mean liquid wavelength to the length of the plate along its beam direction is 0.5 to 5.0, buoyancy means associated with the plate so as to locate the upper surface of the plate at a depth of 1/40 to 1/5 of the length of the plate along its beam direction below the mean liquid surface level, and anchoring means attached to said plate which permit rocking motion of the plate along a horizontal axis in the cross-beam direction.

2. A floating breakwater according to claim 1 in which the plate is flexible along the cross-beam direction.

3. A floating breakwater according to claim 2 in which the plate is formed from corrugated welded sheet steel piling having its ridges running in the beam direction.

4. A floating breakwater according to claim 1 in which the plate is substantially rigid along both its beam direction and cross-beam direction.

5. A floating breakwater according to claim 4 in which the plate is fabricated from concrete having voids filled with a buoyant material.

6. A floating breakwater according to claim 1 in which the ratio of mean liquid wavelength to the length of the plate along its beam direction is 1.0 to 2.0.

7. A floating breakwater according to claim 1 having its mass concentrated near or at a central axis of the plate parallel to the liquid surface, and at right angles to the incident wave direction.

8. A floating breakwater according to claim 1 having an excess buoyancy in the form of surface floats so as to maintain a substantially constant draught.

9. A floating breakwater according to claim 1 wherein the depth of the upper surface of the plate below the mean liquid surface level is 1/30 to 1/20 the length of the plate along its beam direction.

* * * * *